US009484820B2

United States Patent
Hyeon et al.

(10) Patent No.: US 9,484,820 B2
(45) Date of Patent: Nov. 1, 2016

(54) DC/DC CONVERTER, ELECTRONIC APPARATUS HAVING THE SAME AND DC/DC CONVERSION METHOD THEREOF

(71) Applicant: Samsung Electronics Co., Ltd., Suwon-si, Gyeonggi-do (KR)

(72) Inventors: Byeong-cheol Hyeon, Suwon-si (KR); Myoung-jun Lee, Bucheon-si (KR); Sang-hoon Lee, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 296 days.

(21) Appl. No.: 13/932,617

(22) Filed: Jul. 1, 2013

(65) Prior Publication Data

US 2014/0056034 A1  Feb. 27, 2014

(30) Foreign Application Priority Data

Aug. 23, 2012 (KR) ........................ 10-2012-0092640

(51) Int. Cl.
H02M 3/335 (2006.01)

(52) U.S. Cl.
CPC ..... *H02M 3/33507* (2013.01); *H02M 3/33561* (2013.01); *H02M 3/33576* (2013.01)

(58) Field of Classification Search
CPC .................... H02M 3/33592; H02M 3/33561; H02M 2001/0009; H02M 3/33507; H02M 3/33576; H02M 2001/008
USPC ............ 363/98, 89, 21.15, 21.12, 17, 21.02; 323/266, 267
See application file for complete search history.

(56) References Cited

U.S. PATENT DOCUMENTS

| 4,808,905 A | * | 2/1989 | Chen ..................... H04M 19/08 323/222 |
| 5,986,911 A | | 11/1999 | Tang |
| 6,490,178 B1 | * | 12/2002 | Asayama .......... H02M 3/33538 363/21.06 |
| 6,661,209 B2 | | 12/2003 | Patel |

(Continued)

FOREIGN PATENT DOCUMENTS

| KR | 10-2009-0102948 | 10/2009 |
| KR | 10-2009-0102949 | 10/2009 |
| KR | 1020070109096 A | * 6/2010 |

OTHER PUBLICATIONS

Sang-Ho Cho et al., "Zero-Current Switching LLC Resonant Post-Regulator for Independent Multi-Output", 2009, pp. 46-53.

*Primary Examiner* — Jessica Han
*Assistant Examiner* — Lorena Bruner
(74) *Attorney, Agent, or Firm* — Staas & Halsey LLP

(57) ABSTRACT

A multi-output DC/DC converter, which may be included in an electronic apparatus, performs sync switching control using a simplified configuration. The DC/DC converter may include a first switching unit which alternately switches input DC power and converts the DC power into AC power, a converter which converts the AC power and outputs first power and second power, a first output unit which receives the first power and outputs an output voltage, a second output unit which includes a second switching unit, and receives and switches the second power through the second switching unit and outputs an output voltage, and a controller which detects a voltage applied to a winding wire of the first output unit, generates a sync signal by using the detected voltage, compares the sync signal with a predetermined reference and controls the second switching unit to synchronize the second switching unit with the first switching unit.

23 Claims, 13 Drawing Sheets

(56) References Cited

U.S. PATENT DOCUMENTS

| | | | | |
|---|---|---|---|---|
| 6,813,720 B2 * | 11/2004 | Leblanc | ............... | H02M 5/2573 323/237 |
| 7,764,527 B2 * | 7/2010 | Takayanagi | ............ | H02M 7/797 323/267 |
| 7,768,801 B2 * | 8/2010 | Usui | ................. | H02M 3/33561 363/17 |
| 2010/0097826 A1 * | 4/2010 | Xu et al. | ........................ | 363/17 |
| 2012/0147631 A1 * | 6/2012 | Nate | ........................... | 363/21.15 |
| 2014/0146577 A1 * | 5/2014 | Uno | ................. | H02M 3/33561 363/21.02 |

* cited by examiner

DC/DC CONVERTER, ELECTRONIC APPARATUS HAVING THE SAME AND DC/DC CONVERSION METHOD THEREOF

CROSS-REFERENCE TO RELATED APPLICATIONS

This application claims priority from Korean Patent Application No. 10-2012-0092640, filed on Aug. 23, 2012 in the Korean Intellectual Property Office, the disclosure of which is incorporated herein by reference.

BACKGROUND

1. Field

Apparatuses and methods disclosed with respect to the exemplary embodiments described herein relate to a DC/DC converter, an electronic apparatus having the same and a DC/DC conversion method thereof. More particularly, disclosed herein are a DC/DC converter, an electronic apparatus having the same and a DC/DC conversion method thereof which synchronizes an output voltage through a switch in a multi-output DC/DC converter.

2. Description of the Related Art

An electronic apparatus including a display apparatus such as a TV has a power supply within or outside thereof to receive necessary power. The power supply may include a DC/DC converter to supply DC power to the electronic apparatus.

Such a DC/DC converter may be provided as a multi-output DC/DC converter to supply a plurality of output power depending on an applied electronic apparatus.

FIG. 1 illustrates a conventional multi-output DC/DC converter.

As shown therein, a conventional multi-output DC/DC converter includes a main switching unit 11 which generates a high frequency square wave, first and second resonance converters 12 and 13, first and second output units 14 and 15, a main switching controller 16, a sync circuit 17 which synchronizes switching frequencies of the main switching unit 11 and a sync switch Q3 of the second output unit 15, and a sync switching controller 18 which controls a switching operation of the sync switch Q3. The sync circuit 17 includes a pulse transformer 17a and a triangular wave generating circuit 17b. The sync switching controller 18 includes first and second comparison elements 18a and 18b and a gate driving circuit 18c.

Commercial AC power is corrected and adjusted in power factor by a power factor correction (PFC) and output as a DC voltage Vin to the main switching unit 11. The main switching unit 11 is switched on and off alternately by switches Q1 and Q2 according to a switching frequency to flow or block current and changes the input DC voltage Vin into a square wave and transmits the square wave to the first and second resonance converters 12 and 13. The first and second resonance converters 12 and 13 include LC resonance circuits, and convert AC square wave voltage, which has been transmitted by the main switching unit 11, into AC sine wave current and transmit the current to the first and second output units 14 and 15. First output power Vs of the first output unit 14 is transmitted to the main switching controller 16 to control the main switching unit 11. Second output power Va of the second output unit 15 is transmitted to the sync circuit 17, and an output signal of the sync circuit 17 is applied to a sync switch Q3 of the second output unit 15 to control the second output power Va.

The main switching controller 16 receives the first output power Vs and outputs a driving signal to control a switching operation of the Q1 and Q2 of the main switching unit 11. The driving signal of the main switching unit 11 is transmitted to a secondary side of a transformer through the pulse transformer 17a, and transmitted to the second comparison element 18b through the triangular wave generating circuit 17b including an RC filter and an auxiliary switch Qsaw. The triangular wave generating circuit 17b generates and outputs to the second comparison element 18b a triangular wave signal Vsaw which is synchronized with the driving signal of the main switching unit 11.

The second output power Va is applied to the first comparison element 18a, and the second comparison element 18b compares the output signal of the first comparison element 18a with the signal generated by the triangular wave generating circuit 17b and generates a control pulse, which is transmitted to the Q3 through the gate driving circuit 18c.

The pulse transformer 17a in FIG. 1 transmits the driving signal of the main switching unit 11 input to the primary side of the transformer, and thus should overcome a high insulating voltage of the primary and secondary sides and requires multiple windings to generate auxiliary power for driving an integrated circuit (IC). Accordingly, to satisfy the foregoing requirements, there arises a problem of providing a large and expensive pulse transformer 17a.

FIG. 2 illustrates a waveform of an input/output signal of the second comparison element 18b in FIG. 1.

The second comparison element 18b compares the triangular wave signal Vsaw generated by the triangular wave generating circuit 17b with the output signal Vref2 of the first comparison element 18a and generates a driving voltage of Q3. More specifically, as shown in FIG. 2, the output signal SW3 of the sync switching controller 18 outputs 0 if Vref2 is larger than Vsaw, and outputs 1 if Vref2 is smaller than Vsaw. Q3 is synchronized with the main switching unit 11 by the output signal SW3.

However, during the operation of the circuit, the maximum value of the triangular wave Vsaw of the conventional multi-output DC/DC converter may not be maintained consistently. For example, if the switching frequency is large, the maximum value of the triangular wave may be decreased. If the switching frequency is small, the maximum value of the triangular wave may be increased. Accordingly, to precisely control Va through Q3, Vref2 should be fluctuated according to the fluctuation of Vsaw. However, it is difficult to control the output value Vref2 by the first comparison element 18a in real-time.

The conventional multi-output DC/DC converter in FIG. 1 needs an additional gate driving circuit 18c, e.g. a totem-pole circuit to drive a high side gate to thereby operate Q3. Also, upon an increase in the number of auxiliary power Va (i.e., the number of output units) driven by the sync switch Q3 other than the main output power Vs, the number of the sync switching controller 18 is increased accordingly. As the number of parts and costs for the circuit is increased, it is not easy to extend the number of output voltages.

SUMMARY

Additional aspects and/or advantages will be set forth in part in the description which follows and, in part, will be apparent from the description, or may be learned by practice of the invention.

Accordingly, one or more exemplary embodiments provide a DC/DC converter including: a first switching unit which alternately switches input DC power and converts the DC power into AC power; a converter which converts the AC power output by the first switching unit and outputs first power and second power of a secondary side; a first output unit which receives the first power and outputs an output voltage at a predetermined level; a second output unit which includes a second switching unit, and receives and switches the second power through the second switching unit and outputs an output voltage at a predetermined level; and a controller which detects a voltage applied to a winding wire of the first output unit, generates a sync signal by using the detected voltage applied to the winding wire, compares the sync signal with a predetermined reference and controls the second switching unit to synchronize the second switching unit with the first switching unit.

The generated sync signal may include a pulse width modulation (PWM) signal, and the controller may control the second switching unit by adjusting a duty ratio of the PWM signal.

The controller may include a synchronization unit which receives the detected voltage applied to the winding wire and generate the sync signal which is synchronized with a frequency of the first switching unit.

The synchronization unit may include a differentiation circuit which differentiates the voltage applied to the winding wire, a resistor distributor which distributes the voltage applied to the winding wire, and a diode OR circuit which logically sums an output signal of the differentiation circuit.

The controller may include a micom which receives an output signal of the synchronization unit and generates a PWM signal that is synchronized with the first switching unit.

The micom may include a comparator which is set to have a predetermined reference, and the comparator may compare the output signal of the synchronization unit and the reference to generate a clock signal.

The micom may generate a PWM signal whose positive edge or negative edge is synchronized with the clock signal, by using the generated clock signal.

The controller may further include a driver which receives a PWM signal from the micom and outputs a control signal to control the second switching unit.

The micom may reverse the generated PWM signal, and modulate a positive edge of the PWM signal based on the negative edge of the PWM signal and output the PWM signal to the driver.

The driver may include a high side gate driver circuit or a low side gate driver circuit.

The converter may include a multi-output transformer.

The controller may include a first switching controller which controls the first switching unit according to an output voltage of the first output unit.

The converter may include an LC resonance circuit or an LLC resonance circuit.

The foregoing and/or other aspects may be achieved by providing an electronic apparatus including: a system unit which receives power to perform operations; and a DC/DC converter which supplies power to the system unit, wherein the DC/DC converter includes a first switching unit which alternately switches and converts input DC power into AC power; a converter which converts the AC power output by the first switching unit and outputs first power and second power of a secondary side; a first output unit which receives the first power and outputs an output voltage at a predetermined level; a second output unit which includes a second switching unit and receives and switches the second power through the second switching unit and outputs an output voltage at a predetermined level; and a controller which detects a voltage applied to a winding wire of the first output unit, generates a sync signal by using the detected voltage applied to the winding wire, and controls the second switching unit to synchronize the second switching unit with the first switching unit by comparing the sync signal with a predetermined reference.

The generated sync signal may include a PWM signal, and the controller may include a micom which controls the second switching unit by adjusting a duty ratio of the PWM signal.

The controller may further include a first switching controller which controls the first switching unit according to an output voltage of the first output unit.

The foregoing and/or other aspects may be achieved by providing a DC/DC conversion method including: alternately switching and converting input DC power into AC power through a first switching unit; converting the AC power and outputting first power and second power of a secondary side of a converter; receiving the first power and outputting the first power into an output voltage of a first output unit at a predetermined level; receiving the second power and switching and outputting the second power into an output voltage of a second switching unit at a predetermined level; detecting a voltage applied to a winding wire of the first output unit and generating a sync signal by using the detected voltage applied to the winding wire; and outputting a control signal to control the second switching unit to synchronize the second switching unit with the first switching unit by comparing the sync signal with a predetermined reference.

The generated sync signal may include a PWM signal, and the outputting the control signal may include adjusting a duty ratio of the PWM signal.

The outputting the control signal may include generating a clock signal by comparing the sync signal with the reference.

The outputting the control signal may further include generating a PWM signal whose positive edge or negative edge is synchronized with the clock signal, by using the generated clock signal.

The outputting the control signal may further includes reversing the generated PWM signal; and modulating a positive edge of the PWM signal based on a negative edge of the PWM signal.

The DC/DC conversion method may further include controlling the first switching unit according to an output voltage of the first output unit.

The foregoing and/or other aspects may be achieved by providing a DC/DC converter including: a first switching unit which alternately switches input DC power and converts the DC power into AC power; a converter which converts the AC power and outputs first power and second power of a secondary side; a first output unit which receives the first power and outputs a first output voltage; a second output unit which includes a second switching unit, and receives and switches the second power through the second switching unit and outputs a second output voltage; and a controller.

The controller may include: a first switching controller to output a control signal to control the switching of the first switching unit; a micom to receive the second output voltage, and to output, to the first switching controller, a signal; a driver to receive from the micom a signal having an adjusted pulse width having a frequency synchronized with a switching signal of the first switching unit, and to output a control signal to the second switching unit to synchronize the second switching unit with the first switching unit.

The controller may further include a synchronization unit to detect a voltage applied to a winding wire of the first output unit and to generate a sync signal having a same frequency as the first switching unit, using the detected voltage.

The micom may receive the first output voltage and output a control signal to the first switching controller to control the first switching unit. The micom may control the signal sent to the driver to have an adjusted pulse width based on frequency information of the received second output voltage and frequency information of a pulse width modulation (PWM) signal which is synchronized with a clock signal of the micom.

BRIEF DESCRIPTION OF THE DRAWINGS

The above and/or other aspects will become apparent and more readily appreciated from the following description of the exemplary embodiments, taken in conjunction with the accompanying drawings, in which.

DETAILED DESCRIPTION

Figure 1:
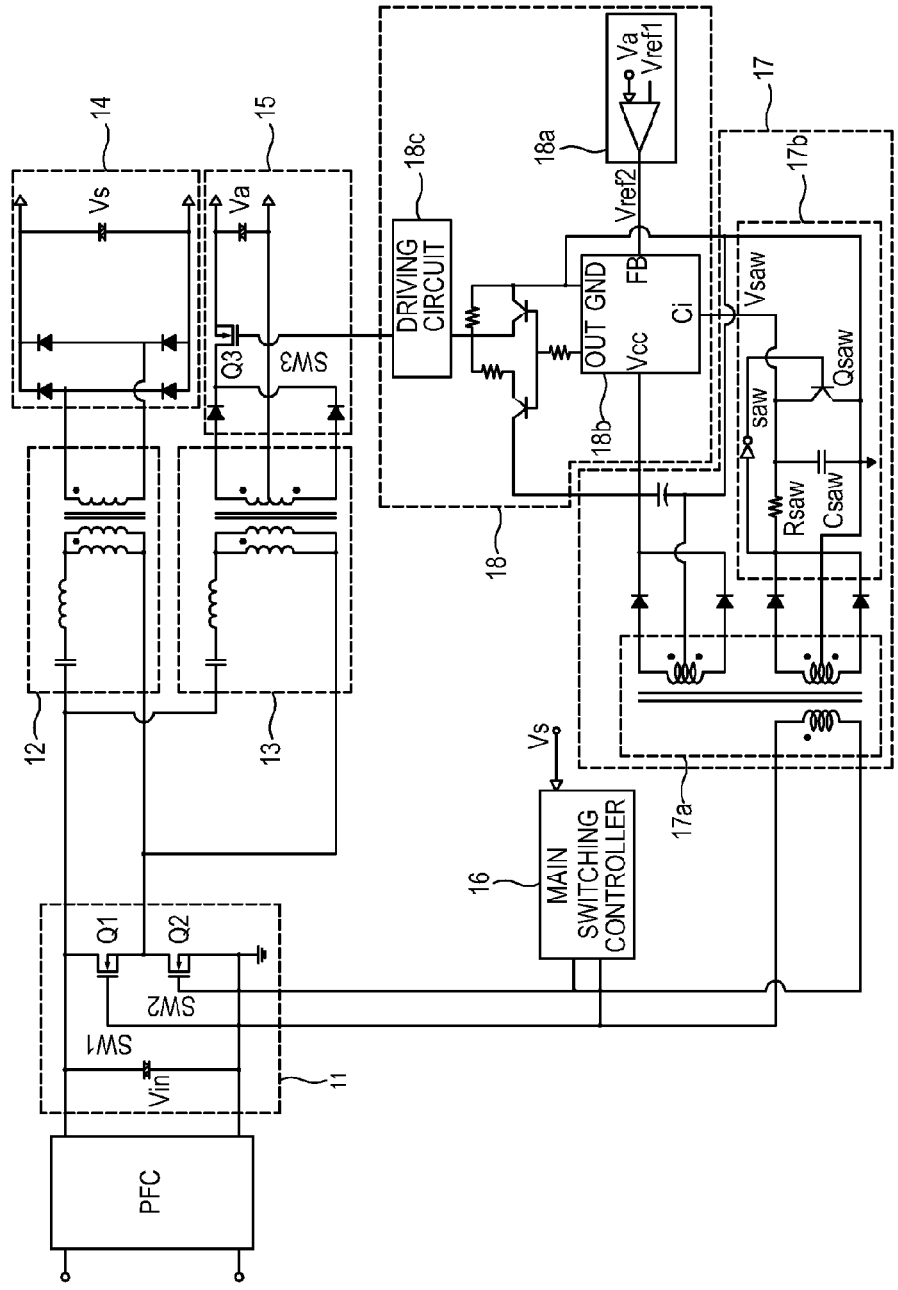
FIG. 1 illustrates a conventional multi-output DC/DC converter.
Figure 2:
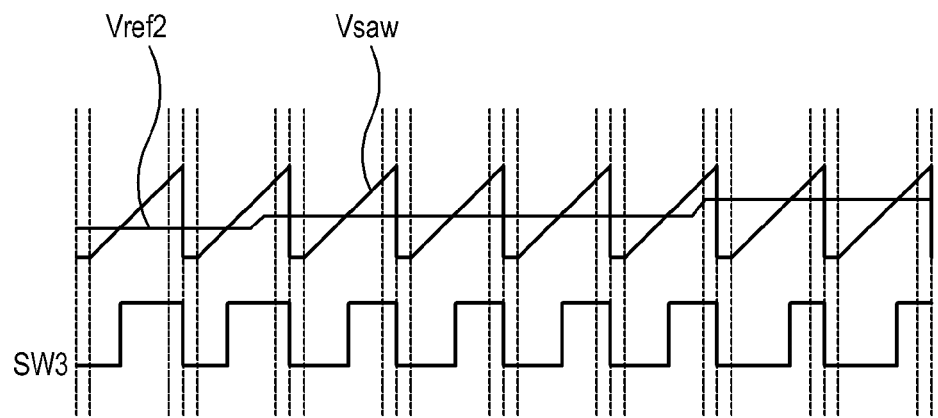
FIG. 2 illustrates waveforms of an input/output signal of a second comparison element in FIG. 1.

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity, and like reference numerals refer to like elements throughout.

Figure 3:
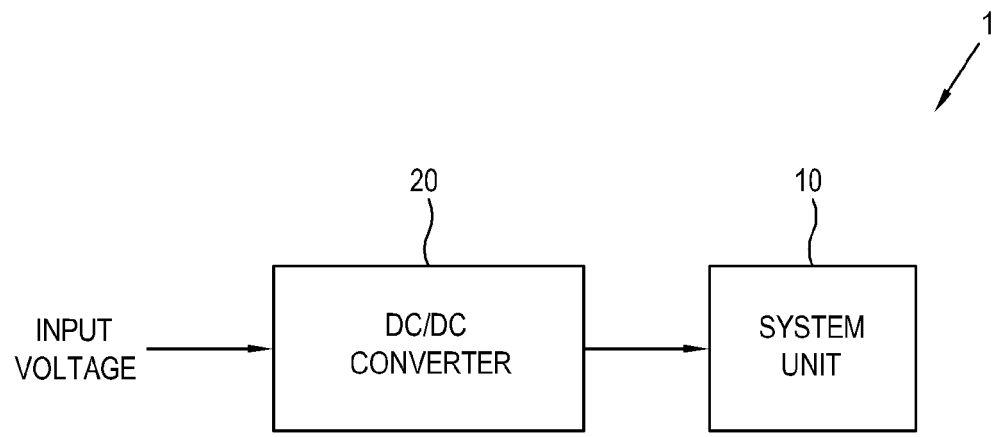
FIG. 3 is a block diagram of an electronic apparatus according to an embodiment.

FIG. 3 is a block diagram of an electronic apparatus 1 according to an embodiment. The electronic apparatus 1 may be implemented as a display apparatus such as a TV or a monitor, or a portable handset such as an MP3 player or a mobile phone, or a computer such as a desktop or laptop computer. As shown therein, the electronic apparatus 1 may include a system unit 10 and a DC/DC converter 20.

The system unit 10 performs operations of the electronic apparatus 1. For example, if the electronic apparatus 1 includes a display apparatus, the system unit 10 may include an image processor which processes an image signal supplied by an external image supply source according to a preset image processing operation to display an image based on the processed image signal, a display unit which displays an image thereon based on an image signal, a communication unit which communicates with the outside, a storage unit which stores various data therein, and a controller (central processing unit) (CPU) which controls the display apparatus.

The DC/DC converter 20 performs a part of functions of a power supply to supply power to the system unit 10. The DC/DC converter 20 outputs an output voltage, as power of the system unit 10, by converting a level of an input DC voltage.

The DC/DC converter 20 may receive DC power Vin as an input voltage which is output by a rectifying/smoothing device (e.g., rectifier 100 in FIG. 4) which rectifies and makes AC power smooth. The DC/DC converter 20 according to the embodiment may be implemented as an independent additional device, or as a single power supply together with the rectifying/smoothing device as in FIG. 4. As the case may be, if power of about 100 W or less is supplied, no rectifying/smoothing device may be provided.

Figure 4:
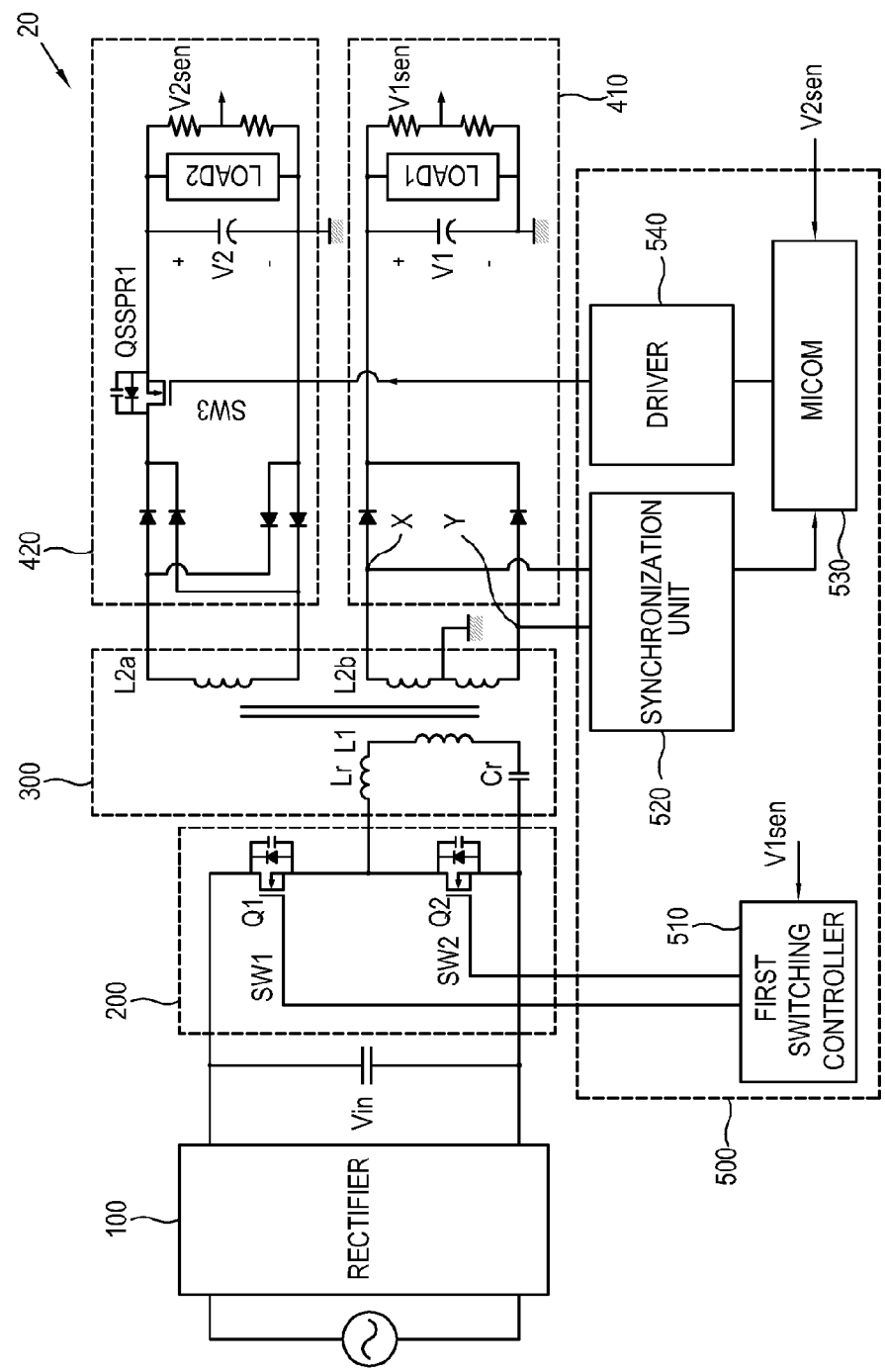
FIG. 4 is a circuit diagram of a DC/DC converter according to the embodiment.

FIG. 4 is a circuit diagram of the DC/DC converter 20 according to an embodiment. The DC/DC converter 20 according to the embodiment is implemented as a multi-output DC/DC converter which provides a plurality of output power V1sen and V2sen, and may include a synchronous switch post regulator (SSPR) which controls an output voltage through only a switch without an additional step down converter after the first and second output terminals 410 and 420.

As shown in FIG. 4, the multi-output DC/DC converter 20 according to an example embodiment receives an input voltage Vin and outputs a plurality of output voltages V1sen and V2sen whose level is converted from the input voltage Vin, to be used as operating power of the system unit 10.

The DC/DC converter 20 according to the example embodiment includes a rectifier 100 which rectifies and converts an AC voltage into a DC voltage, a first switching unit 200 which alternately switches input DC power into AC power, a converter 300 which converts the output AC power from the first switching unit 200 and outputs first and second power of a secondary side, a first output unit 410 which receives the first power and outputs an output voltage at a predetermined level, a second output unit 420 which includes a second switching unit $Q_{SSPR1}$ and receives the second power and is switched by the second switching unit $Q_{SSPR1}$ and outputs an output voltage at a predetermined level, and a controller 500 which detects a voltage applied to a winding wire of the first output unit 410 and controls the second switching unit $Q_{SSPR1}$ to synchronize the second switching unit $Q_{SSPR1}$ with the first switch 200.

The rectifier 100 rectifies a power factor of the input AC voltage/current and converts the AC voltage into a DC voltage, and may be implemented as a power factor correction (PFC).

The first switching unit 200 includes first and second switching elements Q1 and Q2 which are alternately switched on and off to flow or block the input DC power Vin. The first switching unit 200 converts the DC voltage Vin into a square-wave high frequency DC voltage, and is driven to alternately switch the first and second switching elements Q1 and Q2 for a current-flowing time of about 50%. However, other current-flowing times may be selected, and the disclosure is not limited to a current-flowing time of 50%. The AC power which has been switched by the first and second switching elements Q1 and Q2 is transmitted to the converter 300.

The converter 300 converts the AC power output by the first switching unit 200 and outputs the first and second power of the secondary side. The converter 300 converts the square-wave AC voltage applied by the first switching unit 200 into a sine-wave AC voltage and transmits the AC voltage to the first and second output units 410 and 420.

As shown in FIG. 4, the converter 300 may include a multi-output transformer with a single primary winding L1 and a plurality of secondary windings L2a and L2b.

As shown in FIG. 4, the converter 300 according to the present embodiment may employ an LC resonance type circuit including a resonance capacitor Cr and a resonance inductor Lr (Lr-Cr serial connection) connected in series to an input terminal of the first switching unit 100. The converter 300 according to the embodiment may employ an LLC resonance circuit including Lr-Lm-Cr as well as the LC resonance circuit in FIG. 4.

The DC/DC converter 20 according to the embodiment may include the case where the first and second converters output first and second power, respectively, including the case where the converter 300 includes a plurality of signal transformers such as the first and second converters 12 and 13 shown in FIG. 1.

The first and second power which have a sine wave converted by the converter 300 are transmitted to the first and second output units 410 and 420, respectively.

The first output unit 410 receives from the converter 300 and rectifies the first power and outputs the first power as a first DC voltage $V_{1sen}$ at a predetermined level. The first DC voltage $V_{1sen}$ is transmitted to the first switching controller 510 through a resistor distributor. The first output unit 410 becomes a main output unit of the multi-output DC/DC converter according to the present embodiment, and may include a half wave/full wave/center tab type rectification circuit, and C or LC filter type output filter.

The second output unit 420 receives from the converter 300 and rectifies the second power and outputs the second power as a second DC voltage $V_{2sen}$ at a predetermined level. The second output unit 420 includes a second switching unit $Q_{SSPR1}$ including a switching element as in FIG. 4, and rectifies the second power and switches the second power by a control of the controller 500 and outputs the output voltage at a predetermined level as a second DC voltage $V_{2sen}$. The second switching unit $Q_{SSPR1}$ a sync switch which is synchronized with a switching frequency of the first switching unit 200, and the second output unit 420 rectifies an AC sine wave current transmitted through the converter 300, and switches the sync switch $Q_{SSPR1}$ to synchronize the current with the switching period of the first switching unit 200, and controls the current quantity output to the output filter to thereby control the voltage.

As shown in FIG. 4, the controller 500 includes a first switching controller 510 which controls the first switching unit 200 according to an output voltage of the first output unit 400, a synchronization unit 520 which detects a voltage applied to a winding wire of the first output unit 400 and generates a sync signal synchronized with the frequency of the first switching unit 200, a micom 530 which receives the output signal of the synchronization unit 520 and generates a PWM signal synchronized with the first switching unit 200, and a driver 540 which outputs the output signal, applied by the micom 530, to the second switching unit $Q_{SSPR1}$.

The first switching controller 510 receives the output power of the first output unit 410 and controls an alternating switching of the first switching unit 200. The first switching controller 510 receives the first DC voltage $V_{1sen}$, and supplies first and second switching signals sw1 and sw2 controlling a switching duty according to the first DC voltage $V_{1sen}$, to the first and second switching elements Q1 and Q2 of the first switching unit 200. The first and second switching elements Q1 and Q2 receive the first and second switching signals sw1 and sw2 and are alternately switched to achieve a current flowing time of about 50%. However, other current-flowing times may be achieved by controlling a switching duty, and the disclosure is not limited to a current-flowing time of 50%.

Then, the PWM frequency of the first switching unit 100 is controlled by the first switching controller 510, and the first power (main power) is controlled to a predetermined reference value.

Figure 5:
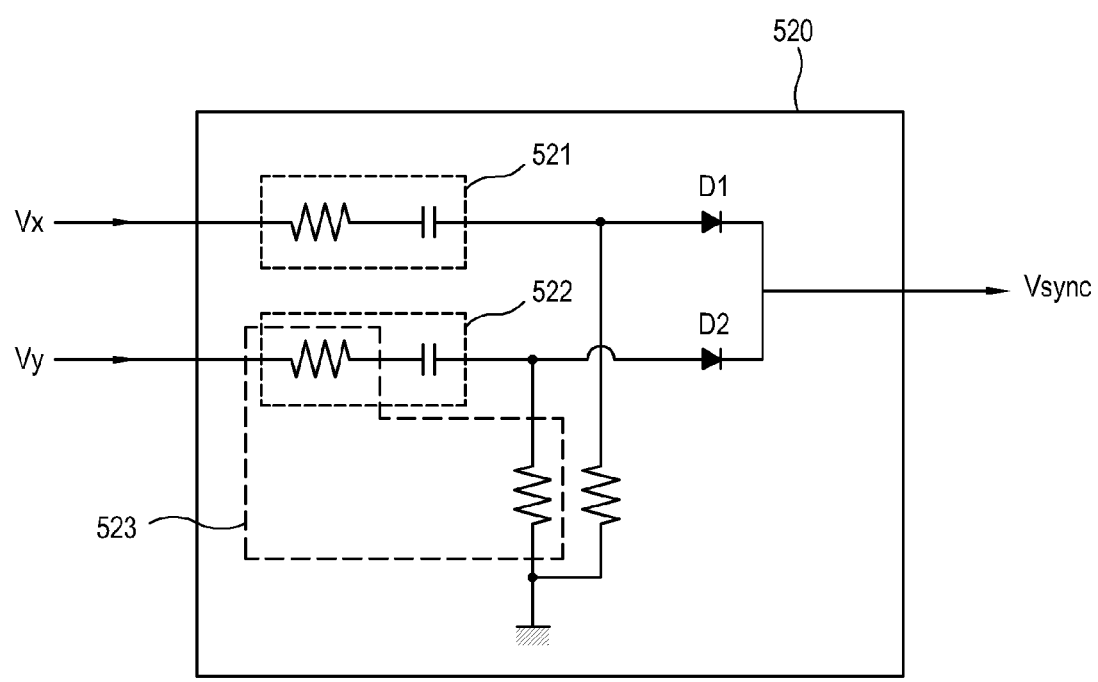
FIG. 5 illustrates an example of a circuit diagram of a synchronization unit in FIG. 4.
Figure 6:
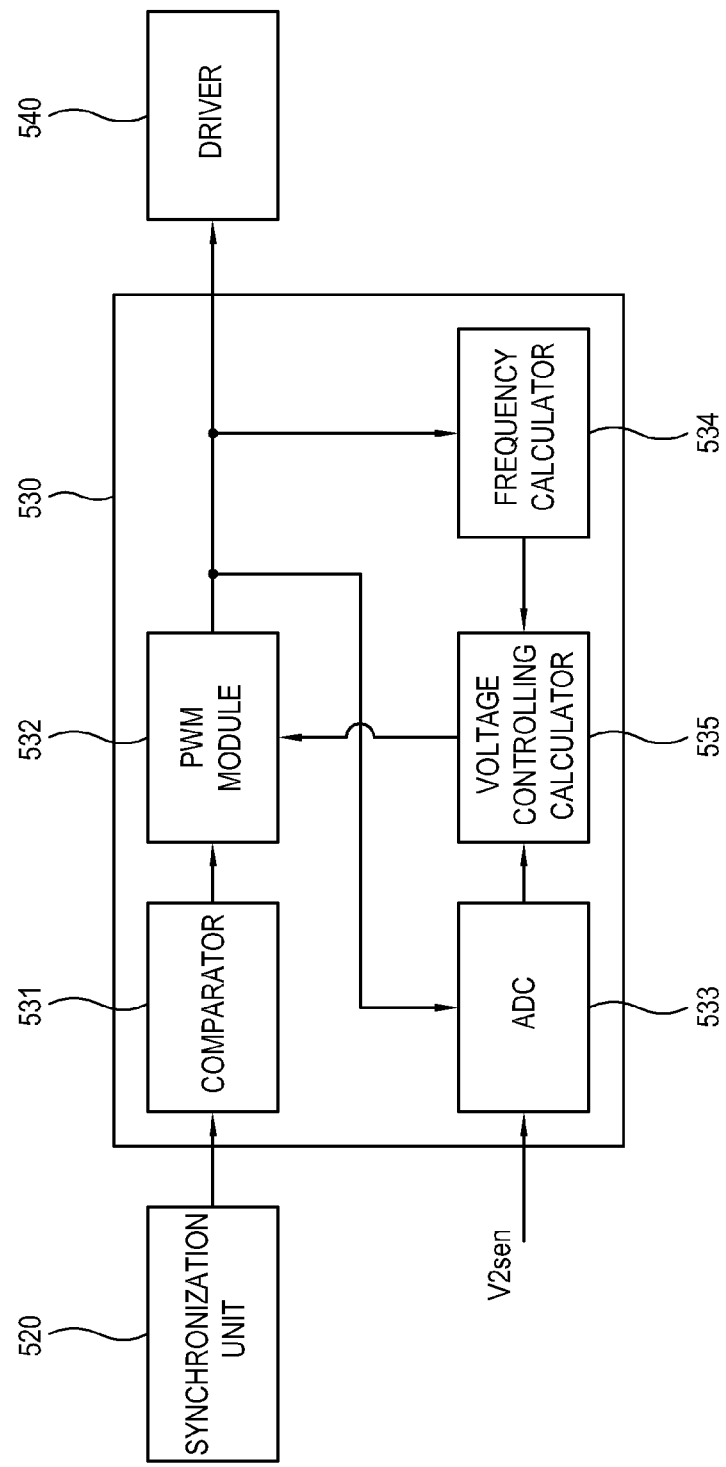
FIG. 6 illustrates an example of a micom in FIG. 4.

FIG. 5 illustrates an example of a circuit diagram of the synchronization unit 520 in FIG. 4. FIG. 6 illustrates an example of the micom 530 in FIG. 4.

The synchronization unit 520 detects voltages Vx and Vy applied to a winding wire of points X and Y of the first output unit 410, measures a switching period through the detected voltages applied to the winding wire, and generates a sync signal synchronized with the frequency of the first switching unit 200.

As shown in FIG. 5, the synchronization unit 520 includes first and second differentiation circuits 521 and 522 which differentiate the voltages Vx and Vy applied to the winding wire, a resistor distributor 523 which distributes the voltages applied to the winding wire, and diode OR circuits D1 and D2 which logically sum the output signal of the first and second differentiation circuits 521 and 522.

Figure 7:
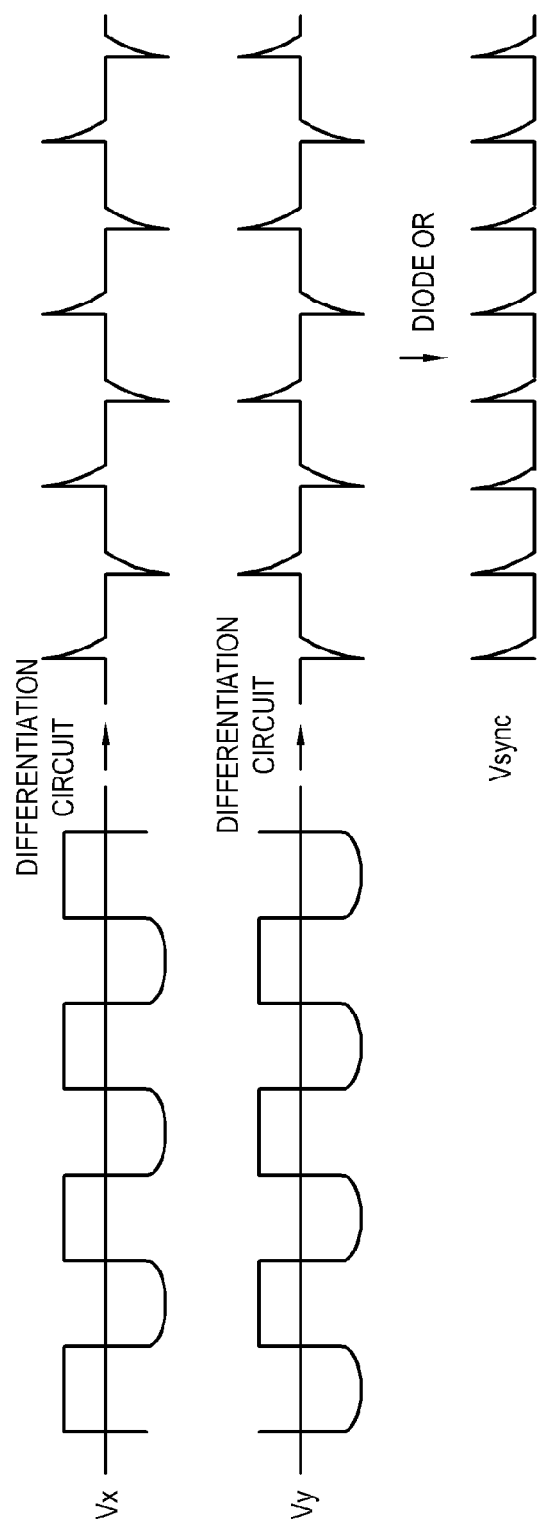
FIG. 7 illustrates a voltage waveform according to an operation of the synchronization unit in FIG. 5.
Figure 8:
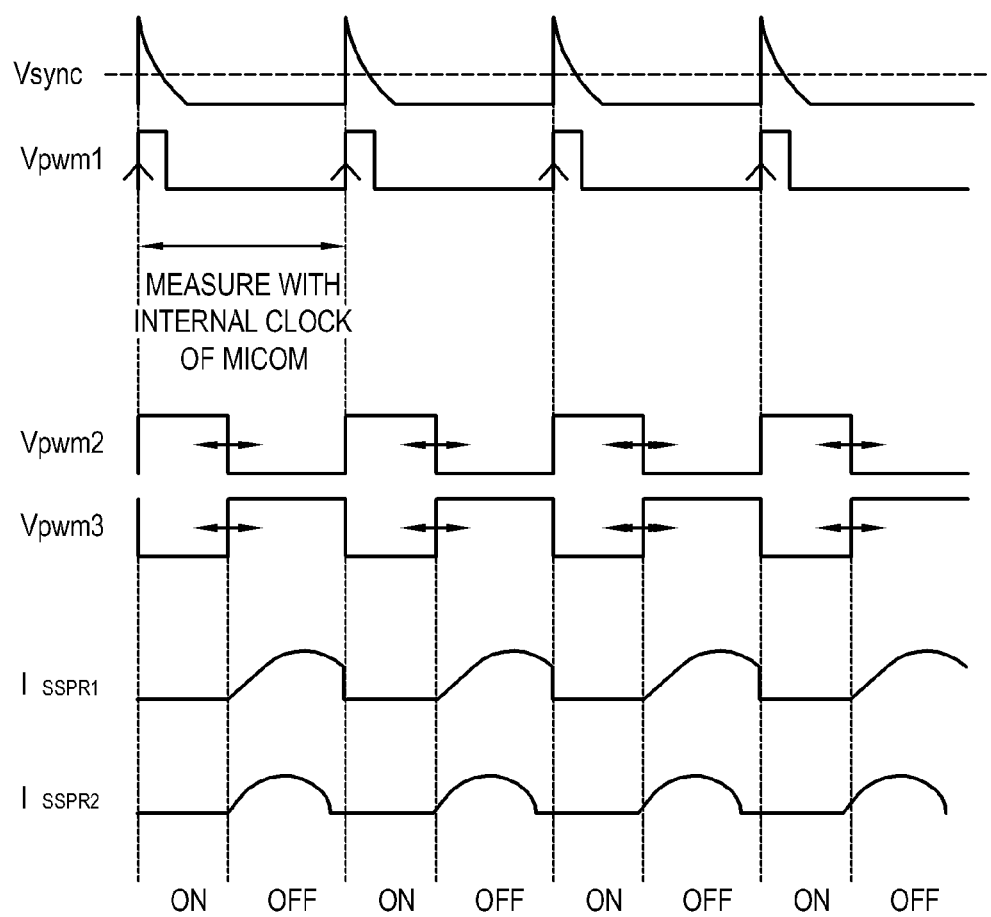
FIG. 8 illustrates a voltage waveform according to an operation of the micom in FIG. 6.

FIG. 7 illustrates a voltage waveform according to an operation of the synchronization unit 520 in FIG. 5. FIG. 8 illustrates a voltage waveform according to an operation of the micom 530 in FIG. 6.

As shown in FIG. 7, the voltages Vx and Vy applied to the winding wire are detected as cross-reversed square waves corresponding to the turn-on/off of the first and second switching elements Q1 and Q2. The detected voltages Vx and Vy applied to the winding wire pass through the first and second differentiation circuits 521 and 522 and the diode OR circuits D1 and D2, and are generated into a sync signal having the same frequency as the first switching unit 200 as in FIG. 7, and output to the micom 530.

In the example embodiment, as shown in FIG. 5, the synchronization unit 520 may be implemented as an analog circuit including the differentiation circuits 521 and 522 and the resistor distributor 523, and may generate a sync signal only with a manual element without the need for an expensive pulse transformer 17a or switching element as shown in the embodiment of FIG. 1.

As shown in FIG. 6, the micom 530 may include a comparator 531 which compares a sync signal Vsync with a predetermined reference, and a PWM module 532 which receives an output voltage of the comparator 531 and outputs a PWM signal with an adjusted pulse width. The comparator 531 may be provided within or outside of the micom 530.

The micom 530 may further include an analog to digital converter (ADC) which receives a second DC voltage $V_{2sen}$ and converts the second DC voltage $V_{2sen}$ into a digital voltage, a frequency calculator 534 which receives the output voltage of the PWM module 532, and a voltage controlling calculator 535 which receives an output of the ADC 533 and frequency calculator 534 and outputs a control signal controlling the PWM module 532.

The DC/DC converter 20 according to the present embodiment is implemented to control a duty ratio of the PWM signal by a digital control of the micom 530 as shown in FIG. 6. The measured switching period of the first switching unit 200 may apply to an upper limit value of the duty ratio of the PWM signal.

As shown in FIG. 8, the comparator 531 compares the sync signal Vsync output by the synchronization unit 520 with a predetermined reference, and generates and outputs to the PWM module 532 a first PWM signal (Vpwm1) as a clock signal according to the comparison result. The PWM module 532 receives the first PWM signal Vpwm1 and generates a second PWM signal (Vpwm2) by a control of the voltage controlling calculator 535. As can be seen from FIG. 8, the dashed line may correspond to the predetermined reference value, which may be a percentage value of Vsync, i.e., a percentage between zero and one-hundred of Vsync, for example, 50% of Vsync.

The PWM module 532 may measure the switching period by using the first PWM signal Vpwm1 and generate a second PWM signal (Vpwm2) whose positive edge or negative edge is synchronized with the first PWM signal (Vpwm1) (clock signal). The second PWM signal Vpwm2 in FIG. 8 is illustrated as an example when a positive edge of the second PWM signal Vpwm2 is synchronized with the clock signal. A pulse width of the second PWM signal (Vpwm2) is digitally controlled by a control signal of the voltage controlling calculator 535. The voltage controlling calculator 535 may receive and use frequency information of the second DC voltage $V_{2sen}$ input through the ADC 533 and frequency information of the output signal of the PWM module 532 to control the pulse width of the PWM module 532.

The micom 530 according to the present embodiment may reverse the second PWM signal (Vpwm2) generated by the micom 530 and generate a third PWM signal (Vpwm3) as in FIG. 8 to use a leading edge modulation method by which a positive edge of the PWM signal Vsspr1 transmitted to the second switching unit $Q_{SSPR1}$ is modulated on the basis of a negative edge of the PWM signal Vsspr1. The reversed third PWM signal (Vpwm3) is transmitted to the driver 540. In reversing the second PWM signal (Vpwm2), it can be seen from FIG. 8 that a negative edge of the third PWM signal Vpwm3 is synchronized with the clock signal, and the positive edge of the third PWM signal Vpwm3 corresponds to the negative edge of the second PWM signal Vpwm2. The micom 530 controls the pulse width by modulating the positive edge of the third PWM signal (Vpwm3) based on the negative edge of the third PWM signal Vpwm3. The L-C resonance circuit of the converter 300 may operate above resonance, and the driver 540 is implemented as a high side gate driver circuit, and thus the first driving current $I_{SSRP1}$ with an adjusted current quantity is output to the second switching unit $Q_{SSPR1}$ according to the PWM of the micom 530 as in FIG. 8. The switching signal SW3 of the second switching unit $Q_{SSPR1}$ (MOSFET) controls the switching of the second switching unit $Q_{SSPR1}$ by the PWM method which is used to adjust the duty ratio of the second switching unit $Q_{SSPR1}$.

If the L-C resonance circuit of the converter 300 operates below resonance and the driver 540 is implemented as a low side gate driver circuit, the micom 530 may employ a trailing edge modulation which does not need reversal. In this case, the second PWM signal Vpwm2, without being reversed, may be transmitted to the driver 540. The micom 530 controls the pulse width by modulating the negative edge of the second PWM signal (Vpwm2) based on the positive edge of the second PWM signal (Vpwm2). The driver 540 outputs to the second switching unit $Q_{SSPR1}$ a second driving current $I_{SSRP2}$ with the adjusted current quantity as in FIG. 8. Likewise, the switching signal SW3 of the second switching unit $Q_{SSPR1}$ (MOSFET) controls the switching of the second switching unit $Q_{SSPR1}$ the PWM method which is used to control the duty ratio of the second switching unit $Q_{SSPR1}$.

Consequently, in the multi-output DC/DC converter according to the embodiments discussed above with respect to FIGS. 4 to 8, the synchronization unit 520 including an analog circuit detects the voltage applied to the winding wire of the first output unit 410 and generates the sync signal of the frequency of the first switching unit 200, and the micom 530 compares the sync signal with a predetermined reference and controls the pulse width of the sync signal by the digital control, and the switching of the second switching unit $Q_{SSPR1}$ is controlled to be synchronized with the first switching unit 200. The second switching unit $Q_{SSPR1}$ is turned on and/or off by the pulse width control of the PWM signal as in FIG. 8. Thus, the multi-output DC/DC converter according to the above-described embodiments may control the SSPR more efficiently with fewer costs than the conventional multi-output DC/DC converter as shown in FIG. 1. For example, the synchronization unit 520 may be configured to operate with a manual element without the need for an expensive pulse transformer 17a or switching element as shown in the embodiment of FIG. 1

Figure 9:
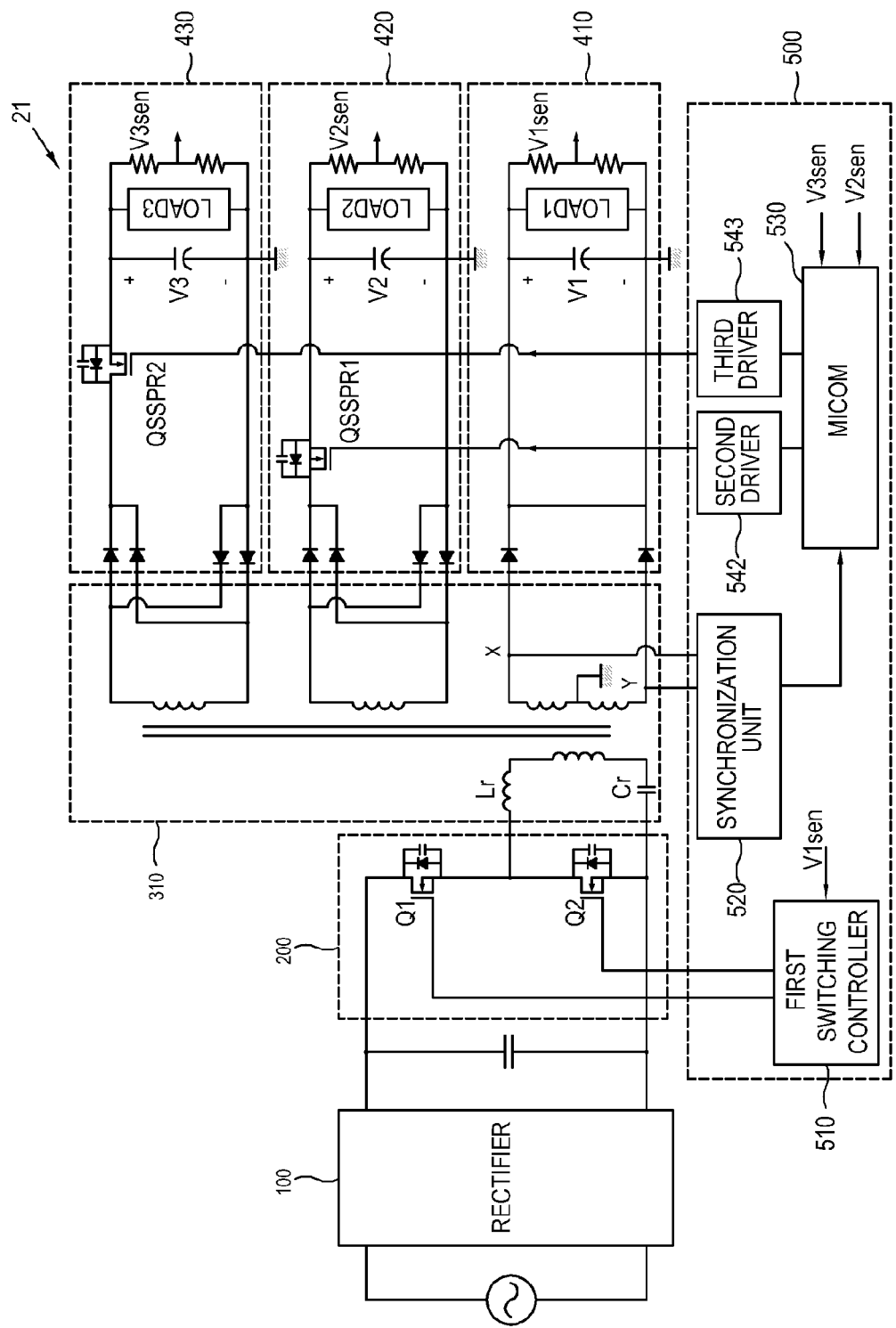
FIG. 9 is a circuit diagram of a multi-output DC/DC converter according to another embodiment.

FIG. 9 is a circuit diagram of a multi-output DC/DC converter 21 according to another embodiment. The multi-output DC/DC converter 21 in FIG. 9 has the number of output voltages increased, compared to the DC/DC converter 20 in FIG. 4.

Compared to the multi-output DC/DC converter 20 in FIG. 4, the multi-output DC/DC converter 21 in FIG. 9 further includes a third output unit 430, and second and third drivers 542 and 543. Other elements other than the third output unit 430 have the same reference numerals and names as those in FIG. 4, and detailed description will be omitted to avoid repetitive description.

The converter 310 converts AC power output by the first switching unit 200 and outputs the AC power as first to third power of the secondary side. The converter 310 converts a square wave AC voltage applied by the first switching unit 200 into a sine wave AC voltage, and transmits the AC voltage to the first to third output units 410, 420 and 430.

The third output unit 430 receives the third power from the converter 310 and rectifies the third power, and outputs the power as a third DC voltage $V_{3sen}$ at a predetermined level. The third output unit 430 includes a third switching unit $Q_{SSPR2}$ including a switching element as in FIG. 9, and rectifies and switches the third power by a control of the controller 500 and outputs an output voltage at a predetermined level as a third DC voltage $V_{3sen}$.

The micom 530 receives a sync signal Vsync from the synchronization unit 520, receives the second and third DC voltages $V_{2sen}$ and $V_{3sen}$, and outputs the PWM signal with an adjusted pulse width to the second and third drivers 542 and 543. As explained in FIG. 4, the micom 530 compares the sync signal Vsync with a predetermined reference and generates a clock signal, and outputs to the second and third drivers 542 and 543 a PWM signal with an adjusted pulse width by using the generated clock signal. The second and third drivers 542 and 543 receive the PWM signal and output a control signal controlling the switching of the second and third switching units $Q_{SSPR1}$ and $Q_{SSPR2}$. The switching of the second and third switching units $Q_{SSPR1}$ and $Q_{SSPR2}$ may be synchronized with the first switching unit 200.

FIG. 9 illustrates an example of the converter including three output terminals, but the multi-output DC/DC converter according to the present embodiment may include four or more output terminals, and the added output terminal (e.g., a fourth output unit) operates like the third output unit 430.

The DC/DC converter 21 according to another embodiment in FIG. 9 may extend the number of output voltages only with an output terminal circuit including the driver and switching element without adding an additional analog control device if the number of the output voltage is extended. That is, as can be seen from FIG. 9, when an additional output unit is added, and the number of output voltages is increased, the addition of an additional analog control device (e.g., an additional synch switching controller) is not necessary, as in the case of a conventional DC/DC converter. Instead, according to the embodiment of FIG. 9, only an additional driver (e.g., third driver 543) and additional switching element (e.g., $Q_{SSPR2}$) may be required when adding another output unit (e.g., third output unit 430).

Figure 10:
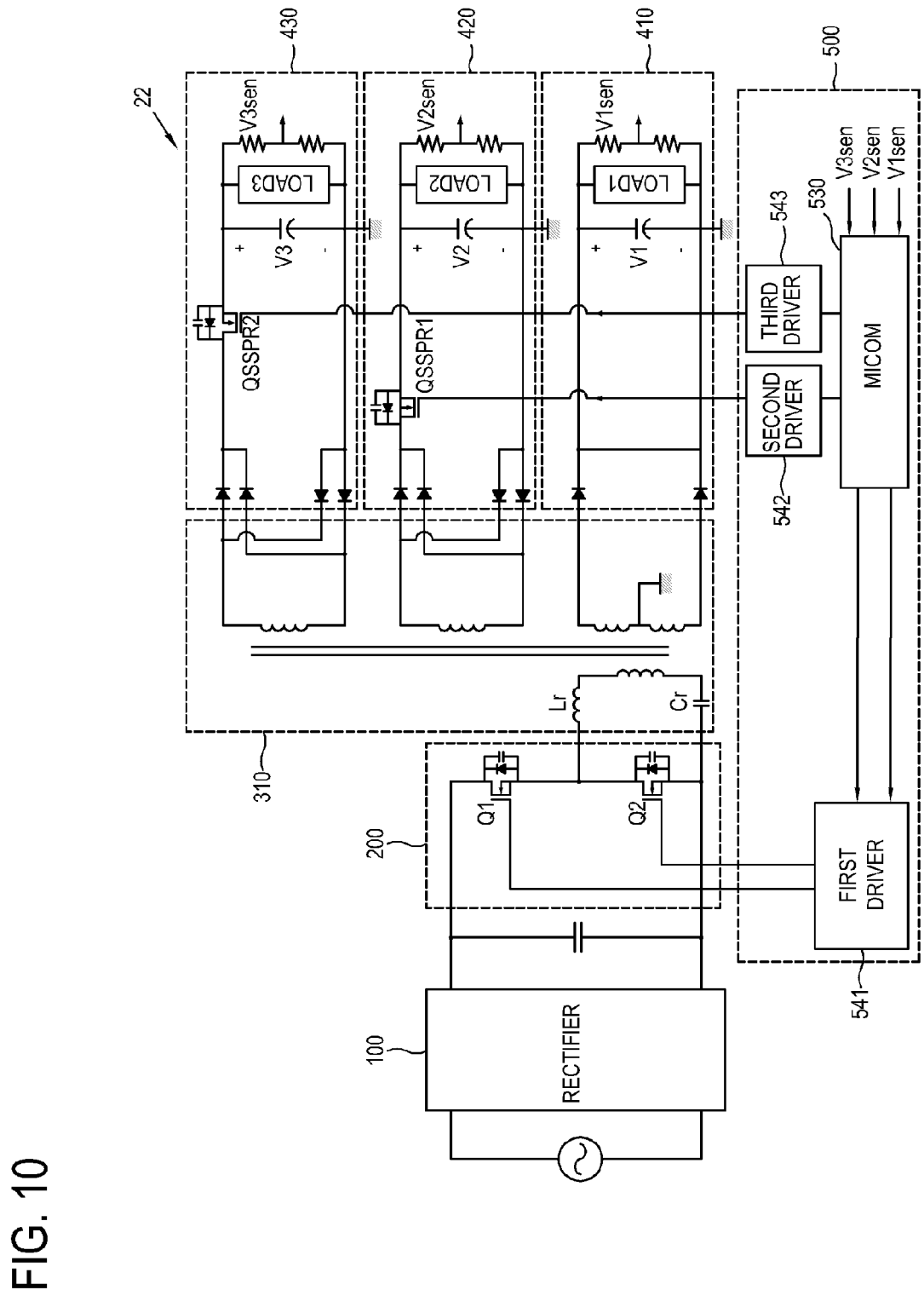
FIG. 10 is a circuit diagram of a DC/DC converter according to another embodiment.

FIG. 10 is a circuit diagram of a DC/DC converter 22 according to another embodiment. Compared to the multi-output DC/DC converter 20 in FIG. 9, the multi-output DC/DC converter 21 in FIG. 10 does not include the synchronization unit 520, and the micom 530 outputs the control signal to the first driver 541 to control the first switching unit 200, and the switching of the first switching unit 200 is controlled by the output signal of the first driver 541. Thus, other elements other than the first driver 541 have the same reference numerals and names as those in FIG. 9, and detailed description will be omitted to avoid repetitive description.

The micom 530 receives first to third DC voltages $V_{1sen}$, $V_{2sen}$ and $V_{3sen}$, and may output to the first to third drivers 541, 542 and 543 a PWM signal with an adjusted pulse width. The micom 530 outputs to the second and third drivers 542 and 543 a PWM signal whose switching frequency is synchronized with the switching signal of the first switching unit 200 output to the first driver 541. The second and third drivers 542 and 543 receive the PWM signal and output a control signal to control the switching of the second and third switching units $Q_{SSPR1}$ and $Q_{SSPR2}$. Thus, the switching of the second third switching units $Q_{SSPR1}$ and $Q_{SSPR2}$ is synchronized with the first switching unit 200.

The DC/DC converter 22 according to another embodiment in FIG. 10 may also extend the number of output voltages only with an output terminal circuit including the driver and switching element without an additional analog control device if the number of output voltages is extended. With respect to the PWM voltage control of the micom 530, the main switching period of the first switching unit 200 is measured in real-time, and the maximum current flowing time of the sync switching element $Q_{SSPR1}$ may be reflected in real-time.

Hereinafter, a conversion method of the DC/DC converter according to the present embodiment will be described with reference to accompanying drawings.

Figure 11:
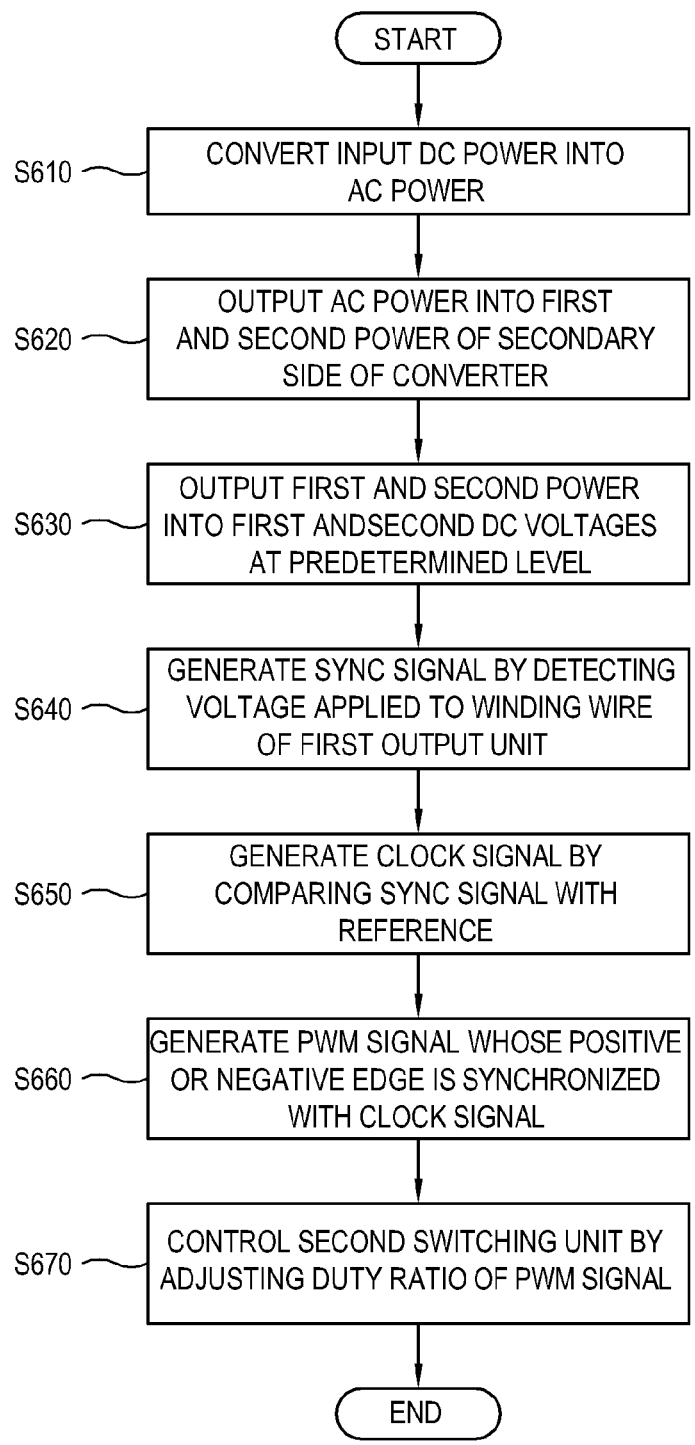
FIG. 11 is a flowchart showing a conversion method of the DC/DC converter according to the embodiment.

FIG. 11 is a flowchart showing a conversion method of the DC/DC converter according to the embodiment.

As shown in FIG. 11, the first switching unit 200 converts input DC power into AC power by alternately switching the first and second switching elements Q1 and Q2 and transmits the AC power to the converter 300 (S610).

The converter 300 outputs the AC power transmitted at operation S610 as first and second power of the secondary side (S620).

The first and second output units 410 and 420 output the first and second power applied by the converter 300 into first and second DC voltages $V_{1sen}$ and $V_{2sen}$ at a predetermined level (S630). Like the DC/DC converter 20 in FIG. 4, the first output unit 410 which outputs the first DC voltage $V_{1sen}$ becomes the main output terminal. If the output terminal is extended as in FIGS. 9 and 10, a corresponding output unit may be added to output third and fourth DC voltages.

The synchronization unit 520 of the controller 500 detects voltages Vx and Vy applied to a winding wire of the first output unit 400, measures the switching period of the first switching unit 200, and generates and transmits to the micom 530 the sync signal Vsync synchronized with the frequency of the first switching unit 200 (S640).

The comparator 531 of the micom 530 compares the sync signal Vsync with the predetermined reference and generates and outputs the clock signal Vpwm1 to the PWM module 532 (S650).

The PWM module 532 of the micom 530 generates the PWM signal Vpwm2 whose positive edge or negative edge is synchronized with the clock signal Vpwm1 by using the clock signal Vpwm1 applied by the comparator 531 (S660).

The PWM module 532 adjusts a duty ratio of the PWM signal Vpwm2 generated by the control of the voltage controlling calculator 535 and outputs the PWM signal Vpwm2 to the driver 540, and the switching of the second switching unit $Q_{SSPR1}$ is controlled to be synchronized with the first switching unit 200 by the switching signal output by the driver 540 (S670). If the driver 540 is a high side gate driver circuit, the micom 530 may reverse the PWM signal Vpwm2 and control the duty ratio by modulating the positive edge of the PWM signal Vpwm2 based on the negative edge thereof.

Figure 12:
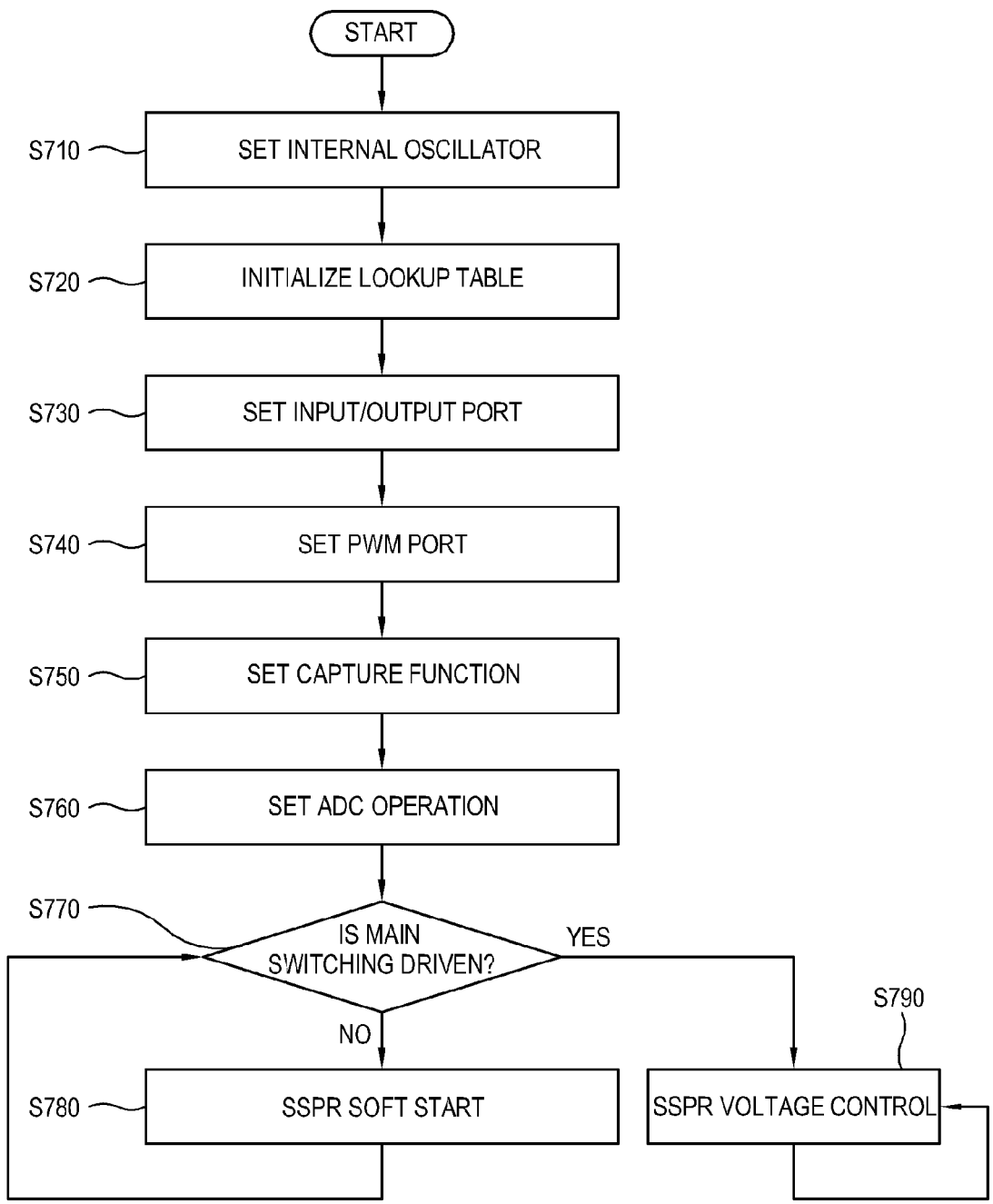
FIG. 12 is a flowchart showing entire operations of the micom according to the embodiment.
Figure 13:
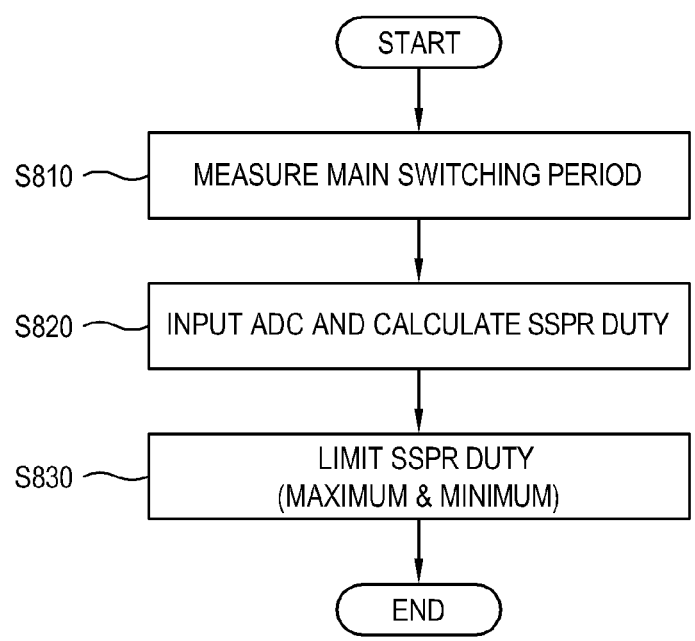
FIG. 13 is a flowchart showing a sync switching control process of the micom in FIG. 12.
Figure 14:
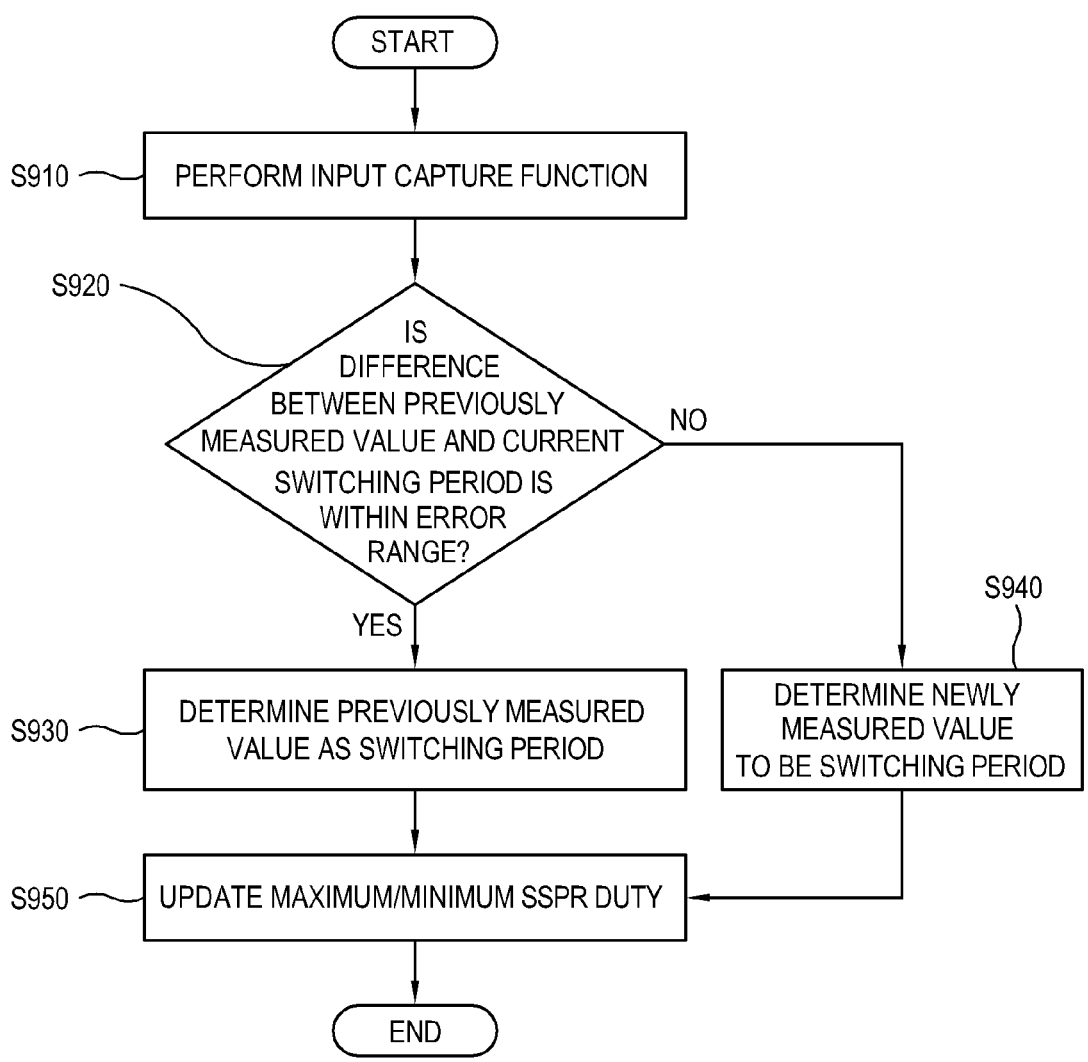
FIG. 14 is a flowchart showing a measurement process of a main switching period in FIG. 13.

FIG. 12 is a flowchart showing entire operations of the micom 530 according to the above-described example embodiments. FIG. 13 is a flowchart showing a sync switching control process of the micom 530 in FIG. 12. FIG. 14 is a flowchart showing a measurement process of the main switching period in FIG. 13. FIGS. 13 and 14 may correspond to the embodiment described with respect to FIG. 10 in which the main switching period is measured by the micom 530.

As shown in FIG. 12, the micom 530 sequentially sets an internal oscillator when initially operating (S710), initializes a lookup table (S720), sets an input/output port (S730), sets a PWM port (S740), sets a capture function (S750), and sets operations of the ADC 533 (S760).

If the initial setting at operations S710 to S760 is completed, the micom 530 determines whether the main switching unit 200 is driven (S770). If it is determined at operation S770 that the main switching unit 200 is not driven, it falls under the initial operation of the DC/DC converter 20, and the micom 530 performs SSPR soft start rather than performing SSPR voltage control to the second switching unit $Q_{SSPR1}$ (S780).

If it is determined at operation S770 that the main switching unit 200 is driven, the micom 530 performs the SSPR voltage control to the second switching unit $Q_{SSPR1}$ (S790).

The micom 530 measures the main switching period of the first switching unit 200 as in FIG. 13 as the SSPR voltage control at operation S790 (S810). If the synchronization unit 520 including the analog circuit is provided as in FIGS. 4 and 9, the micom 530 may receive the output voltage of the synchronization unit 520 to measure the main switching period. Like in FIG. 10, the micom 530 may alternatively receive the first DC voltage $V_{1sen}$ to measure the main switching period and the synchronization unit 520 may be omitted from the DC/DC converter.

If the main switching period is measured at operation S810, the micom 530 calculates the SSPR duty of the second switching unit $Q_{SSPR1}$ by using the input of the ADC 533 and determines the off timing of the PWM signal (S820).

The micom 530 determines maximum and minimum clamping values to the SSPR duty calculated at operation S820 and adjusts the duty ratio of the PWM signal (S830). The micom 530 may adjust the duty ratio of the PWM signal to make a maximum current flowing time of the second switching unit $Q_{SSPR1}$.

The process of measuring the main switching period at operation S810 may include a process of updating the maximum/minimum values of the SSPR duty like in FIG. 14.

More specifically, an input capture function of the micom 530 is performed (S910), and the micom 530 compares the measured value by the capture function at operation S910 with a previously measured value, and determines whether the difference is within a predetermined error range (S920).

If it is determined at operation S920 that the difference is within the error range, the micom 530 determines the previously measured value to be the current switching period (S930).

If it is determined at operation S920 that the difference is out of the error range, the micom 530 determines the newly measured value to be the current switching period (S940).

The switching period determined at operations S930 and S940 may be updated to the maximum/minimum values of the SSPR duty (S950).

According to the example embodiments described herein, the multi-output DC/DC converter may include a synchronization unit as an analog circuit, without the need for an expensive pulse transformer or switching element. The synchronization unit may generate, the sync signal, and the duty ratio of the PWM signal may be adjusted by the digital control of the micom to thereby perform the sync switching control with a simple configuration.

The multi-output DC/DC converter may also extend the number of output voltages by only adding an output circuit including the driver and switching element, without any additional analog control devices.

With respect to the PWM voltage control of the micom, the main switching period may be measured in real-time, and the maximum current flowing time of the sync switching element may be reflected in real-time.

The DC/DC converter and electronic apparatus having the same according to the above-described example embodiments may use one or more processors, which may include a microprocessor, central processing unit (CPU), digital signal processor (DSP), or application-specific integrated circuit (ASIC), as well as portions or combinations of these and other processing devices.

The DC/DC conversion method according to the above-described embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules that are recorded, stored, or fixed in one or more computer-readable storage media, in order to perform the operations of the above-described embodiments, or vice versa. The program instructions may be executed by one or more processors. In addition, a non-transitory computer-readable storage medium may be distributed among computer systems connected through a network and computer-readable codes or program instructions may be stored and executed in a decentralized manner. In addition, the computer-readable storage media may also be embodied in at least one application specific integrated circuit (ASIC) or Field Programmable Gate Array (FPGA).

Although a few exemplary embodiments have been shown and described, it will be appreciated by those skilled in the art that changes may be made to these exemplary embodiments without departing from the principles and spirit of the invention, the range of which is defined in the appended claims and their equivalents.

What is claimed is:

1. A DC/DC converter comprising:
    a first switching unit which alternately switches input DC power and converts the DC power into AC power;
    a converter which converts the AC power and outputs first power and second power of a secondary side of the converter;
    a first output unit which receives the first power and outputs a first output voltage;
    a second output unit which comprises a second switching unit, and receives and switches the second power through the second switching unit to output a second output voltage; and
    a controller which detects a voltage applied to a winding wire of the first output unit, generates a sync signal by using the detected voltage, and controls the second switching unit based on the sync signal which is used to synchronize the second switching unit with the first switching unit,
    wherein the controller comprises a synchronization unit which receives the detected voltage applied to the winding wire and generates the sync signal which is synchronized with a frequency of the first switching unit, and
    wherein the voltage applied to the winding wire is a first voltage applied to one end of the winding wire, and the synchronization unit further comprises:
        a first differentiation circuit which differentiates the first voltage applied to the one end of the winding wire,
        a second differentiation circuit which differentiates a second voltage applied to another end of the winding wire, and
        a diode OR circuit which logically sums a first output signal of the first differentiation circuit and a second output signal of the second differentiation circuit to generate the sync signal.
2. The DC/DC converter according to claim 1, wherein the generated sync signal comprises a pulse width modulation (PWM) signal, and the controller controls the second switching unit by adjusting a duty ratio of the PWM signal.

3. The DC/DC converter according to claim 1, wherein the controller comprises a micom which receives an output signal of the synchronization unit and generates a pulse width modulation (PWM)signal that is synchronized with the first switching unit.

4. The DC/DC converter according to claim 3, wherein the micom comprises a comparator which compares one or more of the first output signal of the synchronization unit and the second output signal of the synchronization unit with a predetermined reference to generate a clock signal.

5. The DC/DC converter according to claim 4, wherein the micom generates a pulse width modulation (PWM) signal having a positive edge or a negative edge that is synchronized with the clock signal, by using the generated clock signal.

6. The DC/DC converter according to claim 3, wherein the controller further comprises a driver which receives a PWM signal from the micom and outputs a control signal to control the second switching unit.

7. The DC/DC converter according to claim 6, wherein when the micom reverses the generated PWM signal, the micom modulates a positive edge of the reversed PWM signal based on a negative edge of the reversed PWM signal and outputs the reversed PWM signal to the driver.

8. The DC/DC converter according to claim 6, wherein the driver comprises a high side gate driver circuit or a low side gate driver circuit.

9. The DC/DC converter according to claim 1, wherein the converter comprises a multi-output transformer.

10. The DC/DC converter according to claim 1, wherein the controller comprises a first switching controller which controls the first switching unit according to the first output voltage of the first output unit.

11. The DC/DC converter according to claim 1, wherein the converter comprises an LC resonance circuit or an LLC resonance circuit.

12. An electronic apparatus comprising:
a system unit which receives power to perform an operation; and
a DC/DC converter which supplies the power to the system unit;
wherein the DC/DC converter comprises a first switching unit which alternately switches and converts input DC power into AC power;
a converter which converts the AC power and outputs first power and second power of a secondary side of the converter;
a first output unit which receives the first power and outputs a first output voltage;
a second output unit which comprises a second switching unit and receives and switches the second power through the second switching unit to output a second output voltage; and
a controller which detects a voltage applied to a winding wire of the first output unit, generates a sync signal by using the detected voltage applied to the winding wire, and controls the second switching unit based on the sync signal to synchronize the second switching unit with the first switching unit by comparing the sync signal with a predetermined reference,
wherein the controller comprises a synchronization unit which receives the detected voltage applied to the winding wire and generates the sync signal which is synchronized with a frequency of the first switching unit, and
wherein the voltage applied to the winding wire is a first voltage applied to one end of the winding wire, and the synchronization unit further comprises:
a first differentiation circuit which differentiates the first voltage applied to the one end of the winding wire,
a second differentiation circuit which differentiates a second voltage applied to another end of the winding wire, and
a diode OR circuit which logically sums a first output signal of the first differentiation circuit and a second output signal of the second differentiation circuit to generate the sync signal.

13. The electronic apparatus according to claim 12, wherein the generated sync signal comprises a pulse width modulation (PWM)signal, and the controller comprises a micom which controls the second switching unit by adjusting a duty ratio of the PWM signal.

14. The electronic apparatus according to claim 13, wherein the controller further comprises a first switching controller which controls the first switching unit according to the first output voltage of the first output unit.

15. A DC/DC conversion method comprising:
alternately switching and converting input DC power into AC power through a first switching unit;
converting the AC power and outputting first power and second power of a secondary side of a converter;
receiving the first power and outputting the first power into a first output voltage of a first output unit;
receiving the second power through a second switching unit and outputting the second power into a second output voltage;
detecting a voltage applied to a winding wire of the first output unit and generating a sync signal by using the detected voltage;
outputting a control signal based on the sync signal to control the second switching unit to synchronize the second switching unit with the first switching unit;
wherein the detecting of the voltage comprises receiving the detected voltage applied to the winding wire and generating the sync signal which is synchronized with a frequency of the first switching unit, and
wherein the voltage applied to the winding wire is a first voltage applied to one end of the winding wire, and the generating of the sync signal further comprises:
differentiating, using a first differentiation circuit, the first voltage applied to the one end of the winding wire,
differentiating, using a second differentiation circuit, a second voltage applied to another end of the winding wire, and
logically summing an output signal of the first differentiation circuit and an output signal of the second differentiation circuit to generate the sync signal.

16. The DC/DC conversion method according to claim 15, wherein the generated sync signal comprises a pulse width modulation (PWM) signal, and the outputting the control signal comprises adjusting a duty ratio of the PWM signal.

17. The DC/DC conversion method according to claim 16, wherein the outputting of the control signal comprises generating a clock signal by comparing the sync signal with a predetermined reference.

18. The DC/DC conversion method according to claim 17, wherein the outputting the control signal further comprises generating a PWM signal with a positive edge or a negative edge that is synchronized with the clock signal, by using the generated clock signal.

19. The DC/DC conversion method according to claim 16, wherein the outputting of the control signal further comprises reversing the generated PWM signal; and
modulating a positive edge of the reversed PWM signal based on a negative edge of the reversed PWM signal and outputting the reversed PWM signal.

20. The DC/DC conversion method according to claim 19, further comprising controlling the first switching unit according to the first output voltage of the first output unit.

21. A DC/DC converter comprising:
a first switching unit which alternately switches input DC power and converts the DC power into AC power;
a converter which converts the AC power and outputs first power and second power of a secondary side of the converter;
a first output unit which receives the first power and outputs a first output voltage;
a second output unit which includes a second switching unit, and receives and switches the second power through the second switching unit to output a second output voltage; and
a controller comprising:
a first switching controller to output a control signal to control the switching of the first switching unit;
a micom to receive the second output voltage, and to output, to the first switching controller, a signal;
a driver to receive from the micom a signal having an adjusted pulse width having a frequency synchronized with a switching signal of the first switching unit, and to output a control signal to the second switching unit to synchronize the second switching unit with the first switching unit; and
a synchronization unit to detect a voltage applied to a winding wire of the first output unit and to generate a sync signal having a same frequency as the first switching unit, using the detected voltage,
wherein the voltage applied to the winding wire is a first voltage applied to one end of the winding wire, and the synchronization unit further comprises:
a first differentiation circuit which differentiates the first voltage applied to the winding wire,
a second differentiation circuit which differentiates a second voltage applied to another end of the winding wire, and
a diode OR circuit which logically sums a first output signal of the first differentiation circuit and a second output signal of the second differentiation circuit to generate the sync signal.

22. The DC/DC converter according to claim 21, wherein the micom receives the first output voltage and outputs a control signal to the first switching controller to control the first switching unit.

23. The DC/DC converter according to claim 21, wherein the micom controls the signal sent to the driver to have an adjusted pulse width based on frequency information of the received second output voltage and frequency information of a pulse width modulation (PWM) signal which is synchronized with a clock signal of the micom.

* * * * *